US010097453B2

(12) United States Patent
Le et al.

(10) Patent No.: US 10,097,453 B2
(45) Date of Patent: Oct. 9, 2018

(54) DATA PACKET RETRANSMISSION PROCESSING

(71) Applicant: International Business Machines Corporation, Armonk, NY (US)

(72) Inventors: Thai Franck Le, White Plains, NY (US); Erich M. Nahum, New York, NY (US); Vasileios Pappas, Elsmford, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/749,746

(22) Filed: Jun. 25, 2015

(65) Prior Publication Data
US 2016/0308764 A1 Oct. 20, 2016

Related U.S. Application Data

(63) Continuation of application No. 14/689,100, filed on Apr. 17, 2015.

(51) Int. Cl.
*H04L 12/721* (2013.01)
*H04L 12/717* (2013.01)
(Continued)

(52) U.S. Cl.
CPC .............. *H04L 45/70* (2013.01); *H04L 45/42* (2013.01); *H04L 45/742* (2013.01);
(Continued)

(58) Field of Classification Search
CPC ......... H04L 45/24; H04L 45/42; H04L 45/70; H04L 45/742; H04L 49/252; H04L 69/163; H04L 69/22
(Continued)

(56) References Cited

U.S. PATENT DOCUMENTS 5,440,707 A 8/1995 Hayes et al.
6,421,731 B1 * 7/2002 Ciotti, Jr. ............ H04W 40/248
709/238

(Continued)

OTHER PUBLICATIONS

List of IBM Patents or Applications Treated as Related.
(Continued)

*Primary Examiner* — Omar J Ghowrwal
*Assistant Examiner* — Kokou R Detse
(74) *Attorney, Agent, or Firm* — Fleit Gibbons Gutman Bongini Bianco PL; Jeffrey N. Giunta

(57) ABSTRACT

Methods for performing retransmission of data packets over a network. A node receives a data packet with a source and a destination address. The data packet is sent along a network path to the destination address, and information associated with the data packet is sent to a controller node that is independent of the network path. A controller receives information associated with a data packet from any forwarder node within a plurality of forwarder nodes each monitoring communications along separate communications paths. An indication of a receipt acknowledgement for the data packet is received from a second forwarder node that is separate from the first forwarder node and the controller node. The receipt acknowledgement is correlated with the data packet and based on the correlating, data associated with retransmission processing of the data packet is deleted.

13 Claims, 9 Drawing Sheets

(51) Int. Cl.
*H04L 12/747* (2013.01)
*H04L 29/06* (2006.01)
*H04L 12/707* (2013.01)
*H04L 12/947* (2013.01)

(52) U.S. Cl.
CPC ............ *H04L 69/163* (2013.01); *H04L 69/22* (2013.01); *H04L 45/24* (2013.01); *H04L 49/252* (2013.01)

(58) Field of Classification Search
USPC ........................................................ 370/392
See application file for complete search history.

(56) References Cited

U.S. PATENT DOCUMENTS

| | | |
|---|---|---|
| 6,529,990 B1 | 3/2003 | Kruse et al. |
| 6,615,323 B1 | 9/2003 | Petersen et al. |
| 8,255,636 B2 | 8/2012 | Batson et al. |
| 2004/0054796 A1* | 3/2004 | Kikuchi ............. H04L 67/1014 709/229 |
| 2012/0093158 A1* | 4/2012 | Chiba .................... H04L 45/38 370/392 |
| 2013/0287024 A1* | 10/2013 | Herberg ................. H04L 45/18 370/392 |
| 2014/0237097 A1* | 8/2014 | Riikonen ................ H04L 47/20 709/223 |

OTHER PUBLICATIONS

Internet Society et al., "Considerations for Internet Group Management Protocol (IGMP) and Multicast Listener Discovery (MLD) Snooping Switches," May 18, 2006, pp. 1-18.

Rendon, J., et al., "Wireless TCP Proposals with Proxy Servers in the GPRS Network," PIMRC, Sep. 2002, pp. 1-5, vol. 3.

Internet Society et al., "Applicability of the Access Node Control Mechanism to Broadband Networks Based on Passive Optical Networks (PONs)," Jun. 19, 2013, pp. 1-79.

\* cited by examiner

DATA PACKET RETRANSMISSION PROCESSING

BACKGROUND

The present disclosure generally relates to the field of communicating data over a network, and more particularly to the field of routing and controlling retransmission of data packets through portions of a network.

Various data communications protocols are used to send data over a network between two data processors. In some examples, networks are able to send that data by using multiple communications paths, sometimes splitting portions of a data transmission across the multiple paths. Some protocols implement data communications where a receiving processor sends acknowledgements indicating successful receipt to the sender of those data packets. Networks are able to include intermediate nodes, such as performance enhancing proxies (PEP), that are able to store data packets and perform retransmission in the case of missing acknowledgements. Transmission of data and associated acknowledgements over multiple paths affects the operation of intermediate nodes that are located in only one path or in a position of the network that does not include all paths used to send a particular data set.

BRIEF SUMMARY

In one example, a method for forwarding data packets includes receiving, at a network node, a data packet with a source address and a destination address. The network node is separate from a source node with the source address and is separate from a destination node with the destination address. The method further includes sending the data packet along a network path to the destination node and sending information associated with the data packet to a controller node, the controller node being independent of the network path.

In another example, a method for controlling data packet retransmission includes receiving, at a controller node, information associated with a data packet from a first forwarder node. The first forwarder node is any forwarder node within a plurality of forwarder nodes each monitoring communications along separate communications paths and each forwarder node further communicating with the controller node. The method further includes receiving, from a second forwarder node subsequent to receiving the information, an indication of a receipt acknowledgement for the data packet where the second forwarder node is separate from the first forwarder node and the controller node. The indication of the receipt acknowledgement is correlated with the data packet and, based on correlating the indication of the receipt acknowledgment with the data packet, data associated with retransmission processing of the data packet is deleted.

In yet another example, a network forwarder node includes a receiver configured to receive a data packet with a source address and a destination address. The network forwarder node is separate from a source node with the source address and separate from a destination node with the destination address. The network forwarder node further includes a packet transmitter configured to send the data packet along a network path to the destination node. The network forwarder node also includes a controller communications interface configured to send information associated with the data packet to a controller node, where the controller node is independent of the network path.

In further example, a controller node includes a receiver configured to receive information associated with a data packet from a first forwarder node, where the first forwarder node is any forwarder node within a plurality of forwarder nodes each monitoring communications along separate communications paths and each forwarder node further communicates with the controller node. The receiver is further configured to receive, from a second forwarder node subsequent to receiving the information, an indication of a receipt acknowledgement for the data packet, where the second forwarder node is separate from the first forwarder node and the controller node. The controller node further includes a processor configured to correlate an indication of the receipt acknowledgement with the data packet and, based on correlating the indication of the receipt acknowledgment with the data packet, the processor is configured to delete data associated with retransmission processing of the data packet.

In another example, a non-transitory computer program product for performing data packet forwarding, the computer program product comprising instructions configured to perform a method that includes receiving, at a network node, a data packet with a source address and a destination address. The network node is separate from a source node with the source address and is separate from a destination node with the destination address. The method further includes sending the data packet along a network path to the destination node and sending information associated with the data packet to a controller node, the controller node being independent of the network path.

In a further example, a non-transitory computer program product for controlling data packet retransmissions, the computer program product comprising instructions configured to perform a method that includes receiving, at a controller node, information associated with a data packet from a first forwarder node. The first forwarder node is any forwarder node within a plurality of forwarder nodes each monitoring communications along separate communications paths and each forwarder node further communicating with the controller node. The method further includes receiving, from a second forwarder node subsequent to receiving the an indication of a receipt acknowledgement for the data packet where the second forwarder node is separate from the first forwarder node and the controller node. The indication of the receipt acknowledgement is correlated with the data packet and, based on correlating the indication of the receipt acknowledgment with the data packet, data associated with retransmission processing of the data packet is deleted.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

Figure 1:
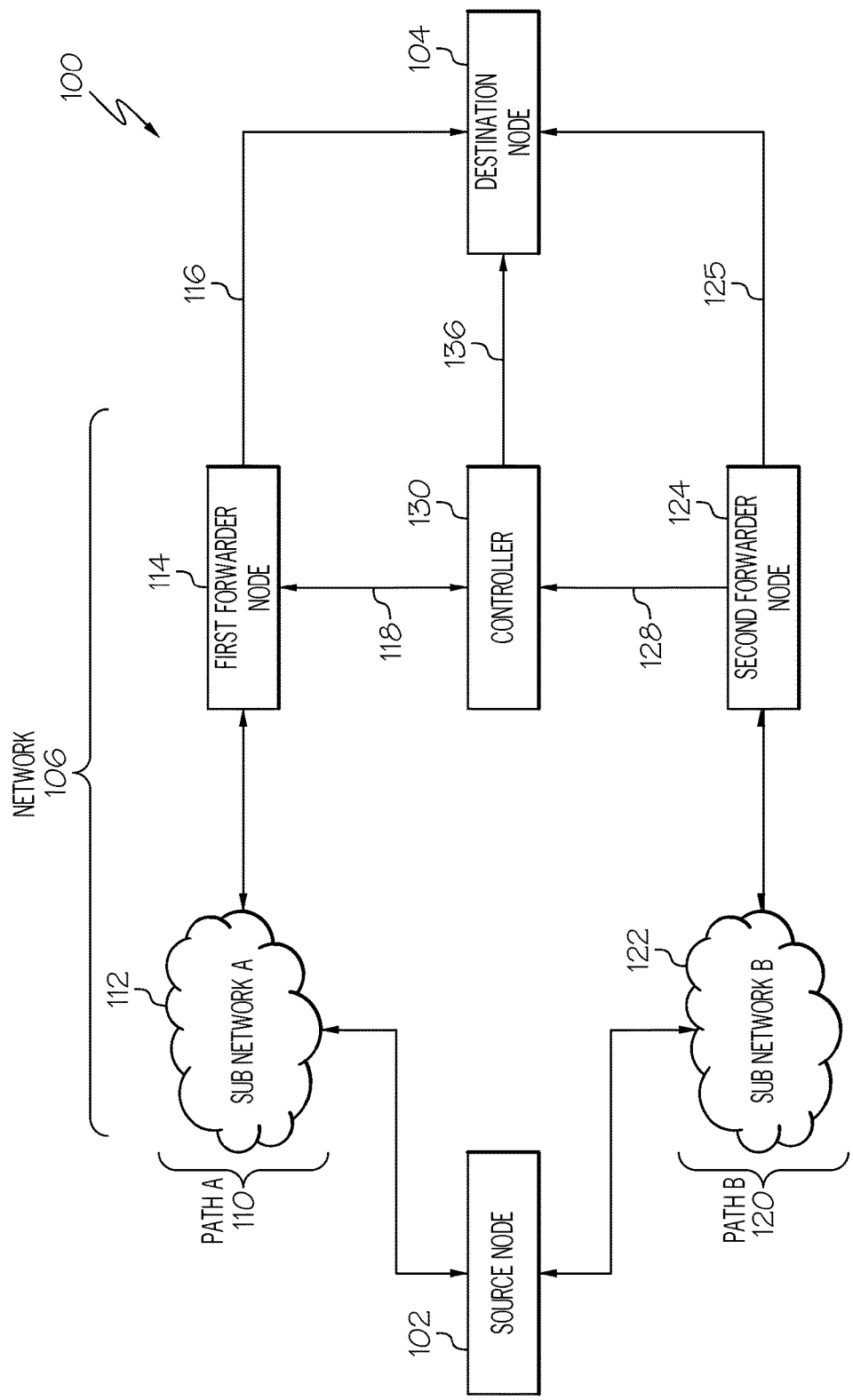
FIG. 1 illustrates an example network topology, according to an example.

The below described systems and methods provide processing to route data packets, including receipt acknowledgements for some data packets through data communications networks, including networks that allow data to be communicated over multiple paths between a source node and a destination node. In an example, a network is able to use the Transmission Control Protocol/Internet Protocol (TCP/IP) protocol stack provide data communications where a set of data is divided into data packets for transmission between a source and a destination, and the receipt of each data packet by the destination is acknowledged to the source. A data packet whose receipt is not acknowledged is able to be resent until acknowledgement is received, thus ensuring successful delivery and receipt of the entire set of data.

An increase in the number of unsuccessfully delivered data packet, such as is indicated by more data packets not having their receipt acknowledged by the destination node, is interpreted in some examples as an indication of network congestion. Unsuccessful delivery of the data packets is often referred to as data packet losses. Network congestion is generally a condition where there is an attempt to send more data through a network path than that path is able to handle. A common response to detecting network congestion is decreasing the amount of data that is communicated through that network path. When communicating over wired networks, an increase in unsuccessfully delivered data packets is able to be a useful indicator of network congestion because data packet losses in wired networks are often caused by buffering limits in routers. When communicating over wireless networks, however, an increase in data packet losses may be a less reliable indicator of congestion. This is because in wireless data packet losses can occur due to issues such as fading, attenuation, and collisions, which are conditions that are more common when using the air as the transmission channel. Interpreting these data packet losses as increased congestion can lead to unnecessarily lowering the data communicated through a wireless channel resulting in under-utilization of that channel.

The below described systems and methods implement what is referred to herein as Distributed Snoop Performance Enhancing Proxy. These are a modified configuration of a "snoop proxy" Performance Enhancing Proxy (PEP) and are data communications proxies that are placed at intermediate locations along network communications paths. Conventional snoop proxies generally monitor data communications sessions, such as a TCP conversation, and determine when a transmitted data packet has been lost by noting that the destination for the data packet has not acknowledged its receipt. The snoop proxy's position closer to the destination than the original sender allows the snoop proxy to recognize the lost data packet before the original sender. Upon noticing the lost data packet, the snoop proxy retransmits that data packet on behalf of the original sender. Since snoop TCP is closer to the destination than the sender is, this allows quicker loss recovery and thus better performance.

The below described Distributed Snoop Performance Enhancing Proxy implements special data packet retransmission processing that includes features that allow these proxies to operate well in many different network topologies, including communications topologies that do not have constant paths or symmetric routing. An advantage of the below systems and methods is their ability to seamlessly operate in a distributed setting, such as where the forward transmission of data and reverse transmission of acknowledgements are not symmetric. An example of a non-symmetric network topology includes a network configuration that routes communication of a data packet from a source node to a destination node over a first path, and routes an acknowledgement of the destination node's receipt of that data packet through a second communications path that is different than the first communications path. Such non-symmetric topologies occur in many environments to improve fault tolerance and availability, such as within enterprise settings where multiple paths are available. The below described systems and methods provide performance enhancement proxies that are able to be placed in each of the above described first path and second path and properly handle monitoring of the data packet communications and also its receipt acknowledgement even though the two are handled by different proxies.

Examples of the below systems and methods conceptually split proxy functionality into two components such that each component is able to be independently resident in different processors or in the same processor. In an example, one of each of these two components is able to reside in different network nodes, such as in different hosts, switches, or routers. The two components are referred to below as a Forwarder Node and a Controller. In an example where both of these components are located in the same node, those two components will operate in a manner similar to other snoop proxies. In such a collocated system, however, the "controller" component in that particular proxy node is able operate in a non-conventional manner by exchanging data with forwarder nodes in other proxies located at different network locations. The controller node is also able to reside in any suitable processing node, including processors that are not performing other data communications functions. For example, a controller is able to reside in a general purpose host processor within any computing facility.

The forwarder node described below sends relevant information about data packet transmissions to the controller, so that the controller is able to control required retransmission of lost data packets. With enough forwarder nodes placed at different vantage points of a complex network topology that has multiple communications paths to connect the various data sources and destinations, the controller is provided with a distributed, network-wide view that gives a complete picture of the connection state between all data sources and destinations. The controller is then able to use this information to determine which data packet retransmissions are required.

In the below described systems and methods, the forwarder node observes the data communications traffic, such as TCP traffic, that flows through that node. The forwarder node is generally placed at a vantage point in the network where it can see data packet flows from other data sources, such as hosts (i.e., at a router, switch, or data packet capture device). In some examples, the forwarder node is configured to match certain types of traffic, based on various criteria (e.g., subnet, IP address, TCP port number, flow direction, etc.). These criteria are able to be specified for a forwarder node by a specified set of determined data packet types that are, for example, configured into the forwarder node. In an example, the data packet type is determined by whether the data packet matches one of these criteria.

When a data packet type matches a data packet type within the set of determined data packet types, a set of information associated with that data packet, which is able to include part or all of the data packet itself, the contents of the data packet payload, a description of the data packet, an identification of the data packet, the connection state of the traffic of which the data packet is a part, other information, or combinations of these, to the controller. Additionally, in some examples, the data packet whose type matches the specified criteria is also able to be cached in a local storage of the forwarder node. The size and replacement policy of any data packet cache of the forwarder node is able to depend on various factors, such as the available resources (CPU, memory, storage) and configuration decisions (e.g., if the controller performs all retransmissions, no caching is needed at the forwarder node).

In various examples, different amounts of data are sent to the controller as the information associated with data packets that match the specified criteria. The information associated with the data packet is able in some example to be a complete replica of the data packet itself. In other examples, the information is able to be a set of meta-data based on the data packet, such as a 5-tuple, the TCP SEQ and ACK numbers of the data packet, or information determined by any other function based on the data packet. The information associated with the data packet can be sent immediately upon determining a match of the data packet type to the specified criteria, or the information for several data packets is able to be grouped into batches for transmission for efficiency reasons. In an example, the forwarder might wait for a number of ACKs for a connection to flow before sending cumulative ACK information to the controller. The information associated with the data packet is able in some examples to be based solely on the data packet. In further examples, the information associated with the data packet is also include environmental information, such as the load at the forwarder, the time of day, the GPS location of the forwarder, and the like.

The controller in various examples receives information from one or more forwarder nodes. In an example, the controller includes processing that tracks the state of the data communications connection in a manner similar to that of a snoop proxy. When the controller determines that a data packet loss has occurred and that retransmission is necessary, the controller causes retransmission of the data packet according to one of two techniques depending upon the configuration of the controller and forwarder nodes. In one example, the controller sends a message to the appropriate forwarder node to instruct the forwarder node to retransmit one or more data packets. In this example, if the forwarder has the relevant data packets cached, it will retransmit them. In another example, the controller is able to retransmit the data packet itself the controller has sufficient information to reconstruct the data packet (such as a copy). Selecting which of these two options to utilize depends on various factors, such as the physical location of the forwarder nodes and routing policies in the network. For example, in a wide-area distributed environment, it may not be feasible to send a replica of each data packet to the controller since that may require a large amount of additional bandwidth. In such a scenario, a network administrator may decide to have the forwarder node cache and retransmit data packets. In an enterprise environment that has sufficient available bandwidth, a network administrator may decide to store data packets in the controller for various reasons, such as simplicity.

While information about a connection state is centralized in this architecture, the controller function is not required to be confined to a single node. For example, it is straightforward to scale the number of controllers by striping or sharing the key information across controllers. In one example architecture, N controllers are able to be used and the forwarder nodes choose which controller to send the information associated with the data packet based on a function of a connection identification number modulo N. In various examples, a connection identification number is able to be any suitable number, such as a combination of the IP addresses and port numbers of each end point. Such methods of scaling the number of controllers allows a system architecture where the controller function is able to efficiently scale with the traffic load and not become a bottleneck.

FIG. 1 illustrates an example network topology 100, according to an example. The illustrated network topology 100 is a high level depiction of a communications system that has a network 106 used to communicate data between a source node 102 and a destination node 104. The terms source and destination are used here to more clearly describe the transmission of one example data packet from the source node 102 to the destination node 104. The illustrated network 106 fully supports the bi-directional communications of data between the source node 102 and destination node 104, including but not limited to the transmission of receipt acknowledgement data packets from the destination node 104 to the source node 102. Only two end point nodes, the source node 102 and destination node 104, are depicted in this figure for simplicity and ease of description of relevant aspects of the below described systems and methods. It is clear that the below concepts are easily and simply applied to a network 106 supports data communications between and among any number of end-point nodes.

The network 106 is shown to include two communications paths, a path A 110 and a path B 120. Path A 110 includes a subnetwork A 112 and a first forwarder node 114. Path B 120 includes a subnetwork B 122 and a second forwarder node 124. The two communications paths in this illustration are simplified in order to more clearly depict and explain relevant aspects of the below described systems and methods. It is clear that a network 106 is able to include many paths or only one path, and that two or more paths are able to share some elements, such as routers or communications links. In general, Path A 110 and Path B 120 are each examples of independent, alternative communications paths of a communications channel, such as is depicted by network 106, that communicatively couples the source node 102 and the destination node 104. Although not show in the interested of more simply depicting the relevant aspects of the presented examples, it is clear that, for example, source node 102 is able to be connected to both sub-network A 112 and subnetwork B 122 through a common communications path.

The first forwarder node 114 in this examples monitors communications over path A 110, which is an example of a first communication path. Similarly, the second forwarder node 124 in this examples monitors communications over path B 120, which is an example of a second communication path. By using separate forwarder nodes to monitor these two separate independent and alternative communications paths, the examples described herein are able to perform special data packet retransmission processing that notes delivery of data packets over one such separate data link, and is able to monitor multiple independent and alternative communications paths for a receipt acknowledgement for each delivered data packet.

The illustrated first forwarder node 114 is shown to communicate with the destination node 104 over a first destination link 116 and second forwarder node 124 is shown to communicate with the destination node 104 over a second destination link 126. These destination links are shown as a line for simplicity of depiction, and it is to be understood that both the first destination link 116 and the second destination link 126 are able to include further communications network elements, including routers and communications links. In some examples, the first destination link 116 and the second destination link 126 are able to both use the same network sub-elements such as routers and communications links.

The first forwarder node 114 and second forwarder node 124 each communicate with a controller 130. As is described in further detail below, the controller 130 operates to control the distributed snoop performance enhancing proxy and associated special retransmission processing implemented by the first forwarder node 114, second forwarder node 124, and the controller 130. This illustration depicts two forwarder nodes for simplicity and clarity of description. The aspects of the below described systems and methods are able to be clearly and easily expanded to systems using any number of forwarder nodes located around a data network topology, systems that distribution the controller function across multiple processors, or systems that include combinations of these.

The controller 130 is shown to communicate with the first forwarder node 114 via a first controller link 118 and with the second forwarder node 124 via a second controller link 128. The first controller link 118 and second controller link 128 are able to be implemented by any suitable data communications architecture, such as by direct links, use of the data communications network linking the forwarder nodes to the destination nodes, a subnetwork, any other communications link, or combinations of these. As is further described below, the controller 130 in some examples is able to send data, such as retransmissions of data packets that originate at the controller, to the destination node through a controller retransmission link 136. The controller retransmission link 136 is able to be implemented through any communications technique, including using part of communications paths forming the first destination link 116 and the second destination link 126.

Figure 2:
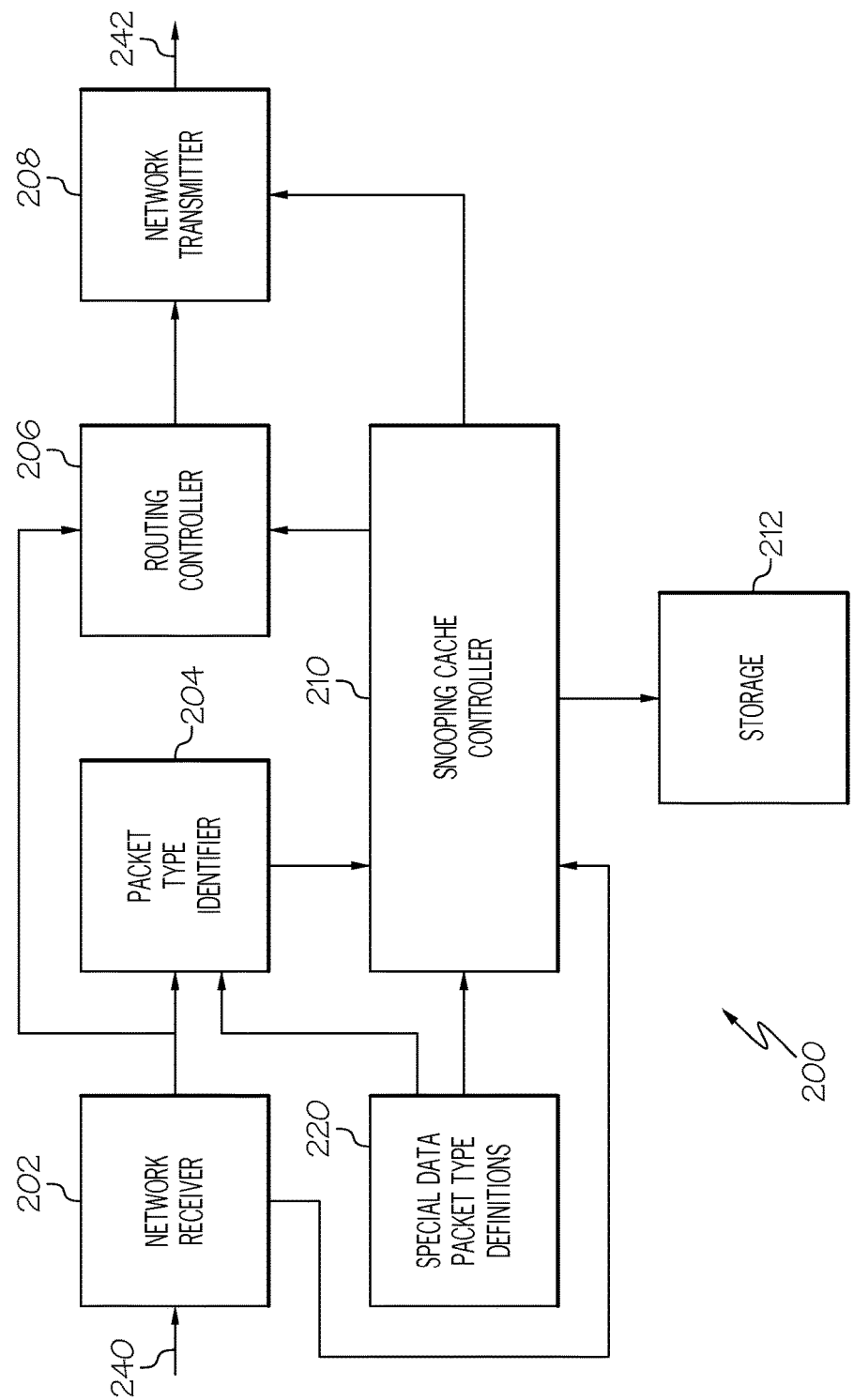
FIG. 2 illustrates a forwarder node block diagram, according to an example.

FIG. 2 illustrates a forwarder node block diagram 200, according to an example. The forwarder node block diagram 200 depicts processing and functions included in a forwarder node, such as the first forwarder node 114 and the second forwarder node 124 described above. The forwarder node block diagram 200 depicts the processing performed on data packets received via a receive port 240 prior to being sent through a transmit port 242. In an example, the processing depicted by the forwarder node block diagram 200 includes conventional data packet router or switching processing in addition to distributed snoop processing as is described herein.

A data packet is received by a network receiver 202 from the receive port 240. In one example, the receive port 240 is a receive data line of a conventional data communications data network. The received data packet in this example is then provided to a data packet type identifier 204 and a routing controller. In some examples, the forwarder only performs special processing for data packets of certain types that implements the special data packet retransmission techniques described herein. The packet type identifier 204 in one example identifies if the received data packet is a data packet upon which special retransmission processing is to be performed.

In one example, the data packet types for which the special data packet processing is performed are defined in the special data packet type definitions 220. The special data packet type definitions 220 are able to specify data packet types by any suitable characteristic that defines data packets for which special processing is desired. For example, a system administrator may decide to only perform special retransmission processing for data packets addressed to destinations within certain subnets, directed to or originating from certain TCP port numbers, directed to or originating from certain IP addresses, direction of data packet flow, any other criteria, or combinations of these.

The packet type identifier 204 provides a determination of the data packet type to the snooping cache controller 210. In various examples, the determination is able to be an explicit determination of the data packet type, or the determination is able to be merely an indication that the type of the data packet satisfies specified criteria and special retransmission processing is to be used for that data packet. The snooping controller 210 in one example controls and implements some of the special retransmission processing for data packets satisfying the specified criteria. In some examples, different processing is able to be performed for different data packet types that satisfy criterial for special retransmission processing. For example, data packets addressed to a specified subnets may be defined to be locally cached at the forwarder node, as is described below, and data packets not addressed to those specified subnets are not locally cached and are, for example, forward to the controller 130 described above for special retransmission processing, as is described below. The particular specification of processing for the different data packet types is able to be defined in, for example, the special data packet type definitions 220 and accessed by the snooping cache controller 210 to determine the particular retransmission processing to be performed.

The snooping cache controller 210 is able to locally cache the data packet in a storage 212. Some or all data packet types for which special retransmission processing is to be performed are able to be cached by the forwarder node to facilitate retransmission directly from that node. The storage 212 is able to include storage elements that are physically near and connected to the forwarder node. The storage 212 is able to be dedicated to that particular node or shared with other nodes. The storage 212 in further able to be located remotely from the particular forwarder node and accessed by any suitable technique. Although the present discussion refers to locally caching data packets at a forwarder node, the term local is used to infer that the management of the caching is handled by that node and the actual data packet storage may be local or, in fact, remote from the forwarder node.

The snooping cache controller 210 provides routing information for the received data packet to the routing controller 206. The routing information may specify that the data packet is to be sent through the network to its specified destination address according to conventional routing methods. This routing information is generally provided in the case of a data packet for which no special retransmission processing is to be performed or a data packet that is locally cached by the forwarder node. In the case of a data packet that is not locally cached by the forwarder node, the snooping cache controller 210 is able to also specify that the data packet is to be forwarded to a controller, such as controller 130 described above. The routing controller then provides the data packet to the network transmitter 208. In some examples, the network transmitter 208 includes a packet transmitter that transmits packets to, for example, a destination node specified by a destination address in the data packet, and part of a controller interface that sends data to the controller node described above. In the presently described example, the packet transmitter within the network transmitter 208 transmits the data packet to the destination address via the transmit port 242. As specified by the snooping cache controller, the data packet is able to be transmitted to the destination node specified by the destination address in the data packet, or to both the destination node and the controller.

In some examples, the snooping cache controller 210 performs special retransmission processing by creating and sending information other than the entire data packet to the controller. For example, the snooping cache controller 210 in some examples creates information consisting of descriptive data such as a 5-tuple, the TCP SEQ and ACK numbers of the data packet, or information determined by any other function based on the data packet, and provides this descriptive data to the network transmitter 208 for transmission to the controller. In the case of retransmission of a data packet that is locally cached in the storage 212 by the forwarder node, the snoop caching controller 210 is able to retrieve or otherwise recreate the data packet from data stored in the storage 212 and provide the data packet to the network transmitter 208 for retransmission through the transmit port 242 to the destination node over an associated communications circuit.

One particular type of data packet processed by a forwarder node is an acknowledgement data packet, e.g., a TCP ACK data packet, that acknowledges receipt of a received data packet. In distributed network architectures, the acknowledgement data packet is able to travel through a different communications path than the path used to carry the data packet being acknowledged. Examples of the forwarder nodes in the described systems and methods define acknowledgement data packets within the special data packet type definitions 220 as data packet types that are to be relayed to their destination address according to conventional processing and to also have additional information associated with the acknowledgment data packet sent to the controller. This provides the controller with information indicating that the particular data packet being acknowledged was received and no further special retransmission processing is required.

The network receiver 202 is also able to include part of a controller interface that receives messages from the controller that indicate actions the forwarder node is to perform. In an example, the network receiver 202 provides messages from the controller to the snooping cache controller 210. Such messages received from the controller are able to include, for example, instructions to retransmit a data packet stored in the storage 212, delete a data packet stored in the data storage 212 (such as would be instructed by the controller upon an indication of an acknowledgement of receipt of the data packet by the destination node), instructions to modify the data packet types stored in the special data packet type definitions 220 and associated actions to take for particular data packet types, other commands, or combinations of these.

Figure 3:
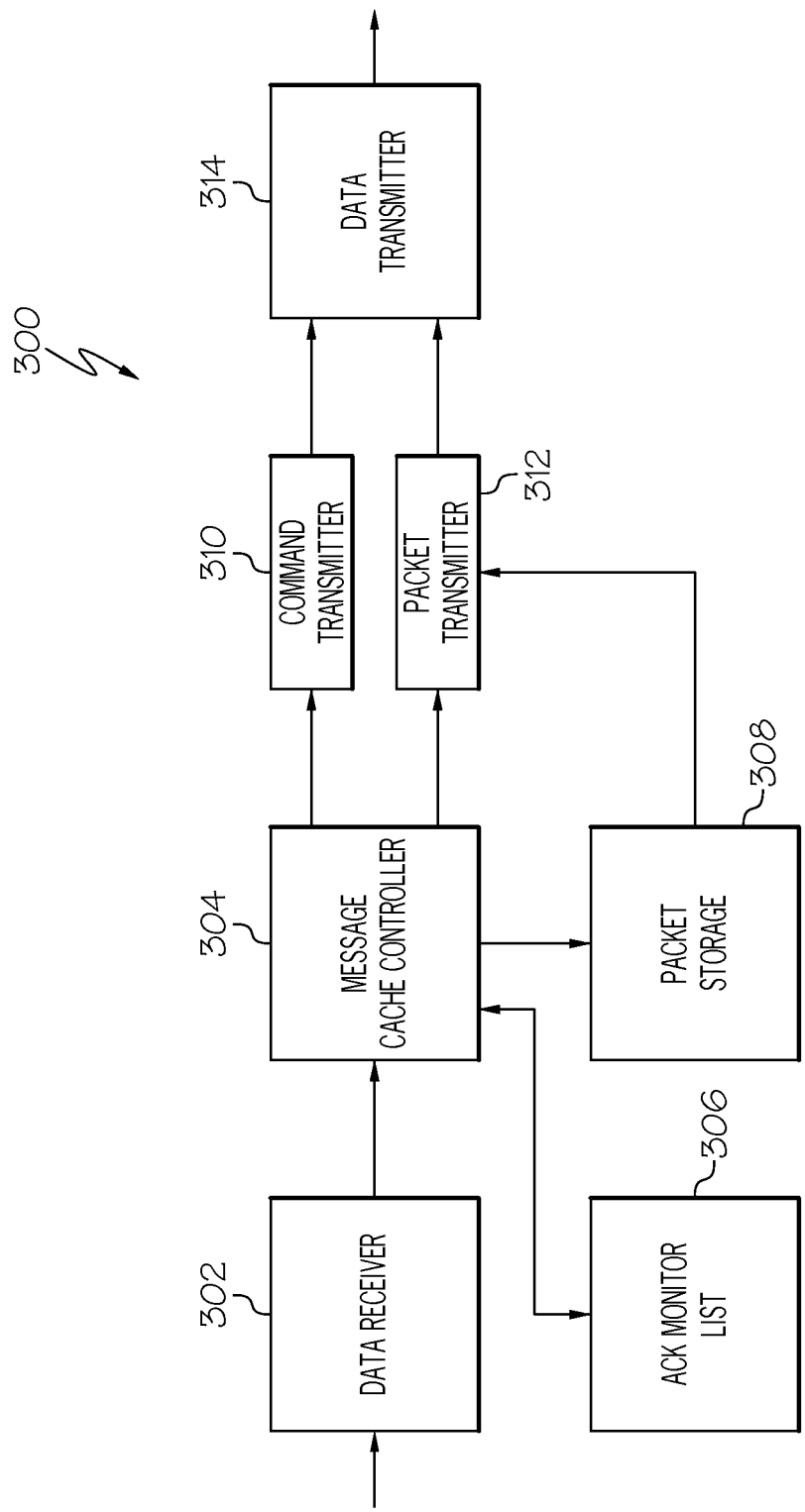
FIG. 3 illustrates a controller block diagram, according to an example.

FIG. 3 illustrates a controller block diagram 300, according to an example. The controller block diagram 300 depicts processing and functions included in a distributed snoop retransmission controller, such as the controller 130 described above. As described above, the controller is in communication with one or more forwarder nodes and receives information associated with data packet transmissions and provides commands, instructions, data, or other information to the forwarder nodes to implement special retransmission processing.

The controller block diagram 300 illustrates a data receiver 302 that receives data and other information from one or more forwarder nodes. The information is able to include information associated with data packets communicated through the forwarder node, indications of receipt acknowledgements by the destination of a data packet, other data from the forwarder nodes, or combinations of these. In some examples, a forwarder node is able to be hosted by the same processor as a forwarder node and the data receiver 302 is able to be, for example, an inter-processor communications interface. In further examples, the forwarder nodes are remote from the controller and the data receiver 302 receives data from any suitable communications channel linking the controller and forwarder nodes.

The data receiver 302 provides received information and data to the cache controller 304. The cache controller 304 in one example controls the special retransmission processing performed by the described systems and methods. The cache controller in one example keeps track of all data packets that have been transferred through forwarder nodes and that are to be processed according to special retransmission processing. Information identifying each such data packet in one example is stored in an ACK monitor list 306. The ACK monitor list in one example stores identifications for each data packet, such as by sequence number, relayed by a forwarder node and removes a stored identification upon receipt of information indicating that the destination node has acknowledged the receipt of the associated data packet.

The controller in some examples is also able to receive enough information associated with a data packet to recreate the data packet and perform the retransmission of the data packet from the controller to the destination node. In such examples, the cache controller 304 stores the information associated with the data packet into a packet storage 308.

The cache controller 304 is also able to send commands to the forwarder nodes. Such commands include a command to retransmit a data packet if that forwarder node is storing information associated with the data packet that allows the data packet to be recreated. Other commands are able to include a command to delete information associated with a particular data packet. A command to delete information associated with a data packet would be sent, for example, would be sent by the controller upon receipt of an indication that the receipt of a data packet has been acknowledged by the destination node for that data packet. The cache controller 304 is able to send such commands through the command transmitter 310. The command transmitter 310 provides the commands to the data transmitter for transmission to the appropriate forwarder node over an appropriate communications channel, such as the first controller link 118 or the second controller link 128 discussed above.

The cache controller 304 further is able to recreate a data packet for retransmission to the destination node, such as upon a time out while waiting for an acknowledgment of a data packet. The cache controller 304 in such a condition operates in conjunction with a packet retransmitter 312 to cause the data packet to be retransmitted to its destination. The packet retransmitter 312 retrieves information associated with the data packet from the packet storage 308, and sends the recreated data packet to the destination node through the data transmitter 314.

Figure 4:
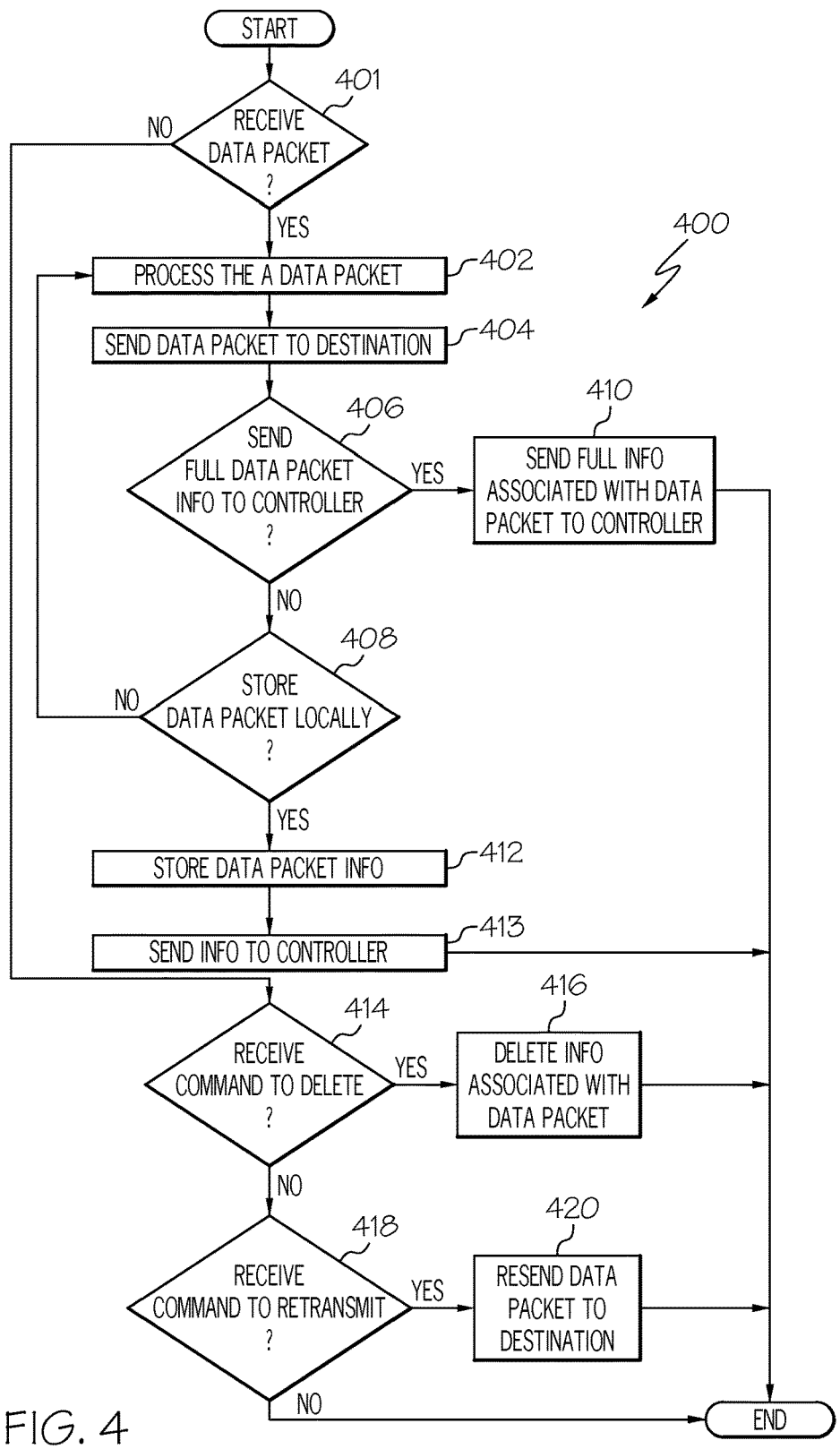
FIG. 4 illustrates a forwarder node processing flow, according to an example.

FIG. 4 illustrates a forwarder node processing flow 400, according to an example. The forwarder node processing flow 400 is an example of processing performed by a forwarder node, such as is reflected in the forwarder node black diagram 200 and illustrated as either the first forwarder node 114 or the second forwarder node 124 above. The forwarder node processing flow 400 in one example illustrates the processing performed on received data packets that are to be forwarded to a destination node and which are to be handled by special retransmission processing.

The forwarder node processing flow 400 beings by determining, at 401, if a data packet that is to be forwarded to a destination node is received, or if a control packet has been received from controller. Referring to the above described example network topology 100 depicted in FIG. 1, this decision is performed in the first forwarder node 114 to determine if a data packet has been received from the subnetwork A 112, or if a command packet has been received from the controller 130 via the first controller link 118. In the case of receiving a data packet, the forwarder node processing flow 400 processes the data packet, at 402. Examples of processing the data packet at this stage include, for example, identifying packet parameters such as source and/or destination address subnet, data packet types, other information used to route the data packet or perform special retransmission processing, other processing, or combinations of these.

After processing the data packet, at 402, the data packet is then sent, at 404, to the destination specified for the data packet. In some examples, sending of the data packet is accomplished by sending the data packet via a communications path, which may include further intermediary nodes, defined by the network topology that leads to the data packet being delivered to destination specified for the data packet.

The forwarder node processing flow 400 continues by determining, at 406, if a full set of information associated with the data packet is to be sent to the controller for cache storage. This determination is able to be based upon, for example, a configuration of the forwarder node to either locally store such information or to forward such information to the controller to allow the controller to store the information to recreate the data packet for retransmission. In some examples, this determination is based on a determined data packet type or other characteristic of the data packet. For example, a configuration of the forwarder node may specify that only certain data packet types or data packets sent to or originating from certain sub-nets are to be sent to the controller for cache storage to support the special retransmission processing described herein.

Upon a determination that the full set of information about the data packet is to be sent to the controller, the information that is to be sent is selected and sent to the controller, at 410. In some examples, the full set of information associated with the data packet is a portion of the data packet that includes a selected subset of the contents of the data packet and other data associated with the data packet transmission. In these examples, the subset of information is selected and only that subset is sent to the controller. In some examples, the particular subset of data is able to be selected based upon for example, a determined data packet type.

In an example of a data packet carrying user data within a data packet payload portion, the full set of information sent to the controller includes information that sufficiently defines the data packet in order to support sufficient recreation of the data packet for retransmission to the destination node. For example, the portion of the data packet sent to the controller is able to include at least the data packet payload, addressing information, and possibly other relevant data that is selected as the subset of data to send to the controller.

In some examples, a "full" set of information is not required to include all of the data needed to recreate the data packet. Such data packets will not be recreated and retransmitted by the controller, but the communication and failure of such packets to a destination is to be traced for various reasons, such as to determine communications reliability to the destination. In one such an example, the subset of data to be selected as information to send to the controller is able to be data that is only sufficient to identify the data packet for correlation of a receipt acknowledgement with the data packet.

Another example is the processing by a forwarder node of receipt acknowledgement data packets. In such an example, the "full" set of information associated with receipt acknowledgment messages, e.g., TCP ACK messages, is able to be a reduced set of information that is only information to allow the controller identify the data packet whose receipt is being acknowledged and thereby end special retransmission processing or that data packet. Information associated with such acknowledgment messages may be abbreviated according to various designs to merely indicate the data packet being acknowledged by using a reduced set of data. Various other criteria for acknowledgement messages may also be defined, such as only sending information associated with acknowledgement messages originating from certain sub-nets, addressed to certain sub-nets, any other criteria, or combinations thereof.

After the information is sent, at 410, the forwarder node processing flow 400 then ends.

Returning to the determination at 406, if it is determined that information associated with the data packet is not to be sent to the controller, a determination is made as to whether the information associated with the data packet is to be stored locally. In one example, information is able to be neither stored locally nor sent to the controller because no special retransmission processing is performed for that data packet. This determination is able to be based on, for example, a determined data packet type for the data packet, where some data packet types are defined as not being subjected to special retransmission processing. In one example, the originator of the data packet handles retransmission of data packets in the case of a failed data packet delivery.

If it is determined to locally store the information associated with the data packet, the information associated with the data packet is stored, at 412. The information associated with the data packet is able to be at least a portion of the data packet, where the portion is selected to be sufficient to recreate the data packet or support other processing. In addition to storing this information locally, information associated with the data packet is also sent, at 413, to the controller. Because the full set of information used to recreate the data packet is stored locally, a reduced set of information is able to be sent to the controller in some examples. For example, information associated with a data packet that is sent to the controller is able to consist of only information to identify the data packet for correlation of a receipt acknowledgement with that data packet. After the information associated with the data packet is sent, at 413, the forwarder node processing flow 400 ends.

Referring to the above described determination, at 401, as to whether a data packet or a control packet is received, in the case of receiving a control packet, such as from a controller 130 described above, the forwarder node processing flow 400 determines, at 414, whether an acknowledgement message for the stored data packet is received, or if a message is received from the controller to delete the stored message. These actions usually occur during a time interval while waiting for a receipt acknowledgement for the data packet, which is referred to as an acknowledgement timeout time interval. The controller is able to send a message to delete the stored message to the forwarder node when, for example, another forwarder node receives an acknowledgement message from the destination of the data packet and forwards information associated with that acknowledgment message to the controller. In some examples, this determination is not dependent upon receiving an acknowledgment for the data packet itself, but only upon receipt of a message from the controller to delete the message. If this determination is true, the information associated with the data packet is deleted, at 416. The forwarder node processing flow 400 then ends.

Returning to the determination at 414, if this determination is not true, a determination is made, at 418 as to whether a command has been received to retransmit the stored data packet to its destination. If a retransmission instruction has been received, at least a portion of the data packet that was stored in the local storage is resent as a retransmission data packet to its destination, at 420. If such a command, such as a retransmission instruction, is not received, or after the resending at 420, the forwarder node processing flow 400 then ends.

Figure 5:
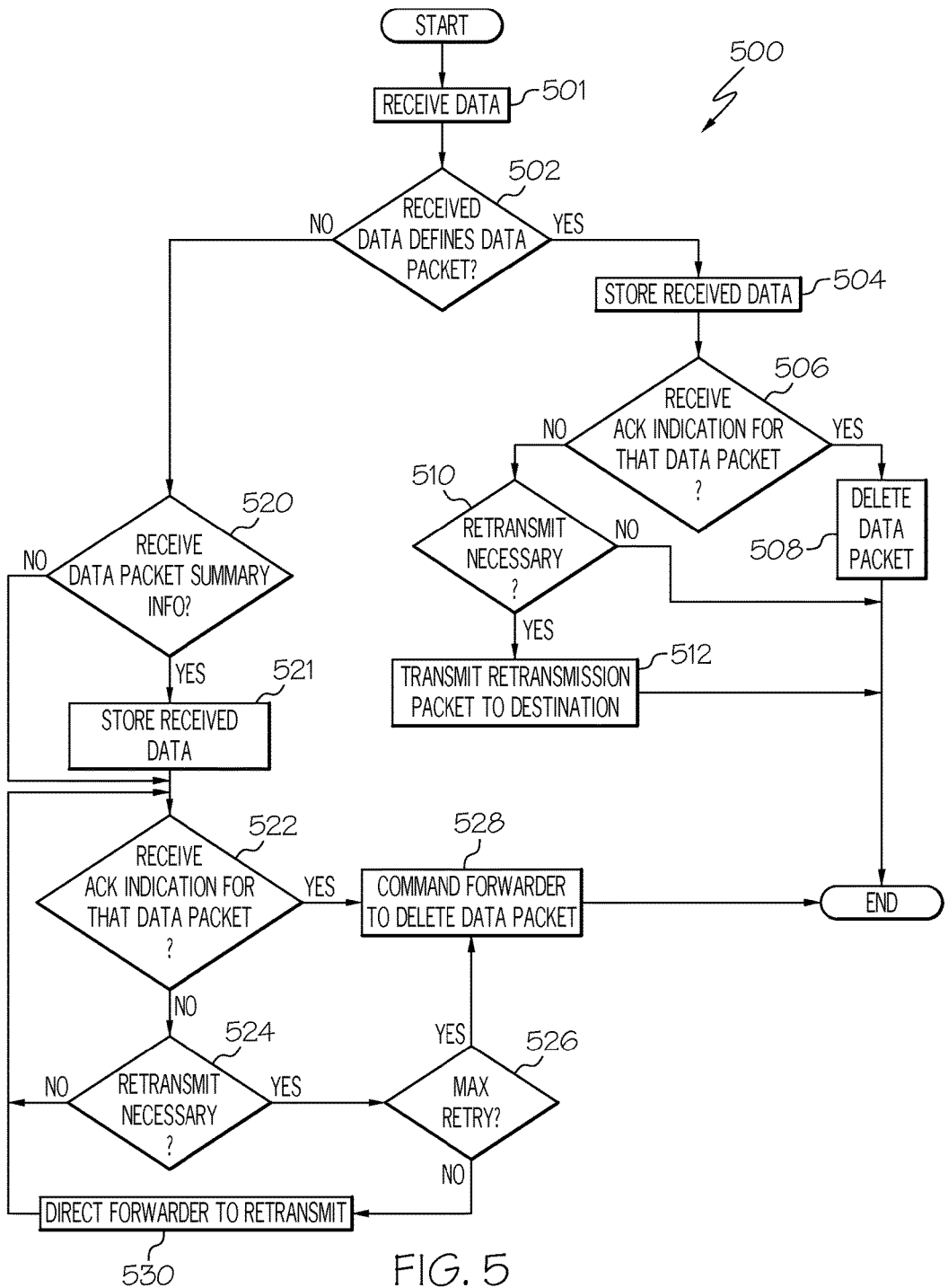
FIG. 5 illustrates a controller processing flow, according to an example.

FIG. 5 illustrates a controller processing flow 500, according to an example. The controller processing flow 500 is an example of processing performed by a controller, such as is reflected in the controller black diagram 300 and illustrated as the controller 130 above. The controller processing flow 500 in one example illustrates the processing performed to control the special retransmission processing as is described herein.

The controller processing flow 500 beings by receiving, at 501, data from a forwarder node. The data sent by a forwarder node to a controller is described in detail above and is able to include information associated with a data packet being forwarded by the forwarder node. A determination is made, at 502, if the received data sufficiently defines the data packet in order to support recreation of a retransmission data packet to be sent as a retransmission of the data packet to the destination node if required. Data that defines a data packet is able to include a complete data packet that was received and forwarded by the forwarder node, or such data may be other data that allows reconstruction of the data packet for later retransmission if required. In one example, the information includes the data packet addressing data and data packet payload data contained within the data packet. If this determination is true, the received data is stored, at 504.

A determination is then made, at 506, if an indication of a receipt acknowledgement for that data packet has been received. In general, a controller is configured to wait for a defined time interval after transmission of a data packet to a destination node, a time interval referred to herein as an acknowledgment timeout time interval, for the destination node to return a data packet that acknowledges receipt of the data packet. A receipt acknowledgement data packet is determined to not have been received in some examples if it is not received within this acknowledgment timeout time interval. As described above, forwarder nodes are able to send to the controller a set of information, which may include the full receipt acknowledgement packet or an abbreviated set of information associated with the packet, where the set of information is an indication of a receipt acknowledgement of a data packets by the destination node. In an example, the controller correlates the set of information in the received indication of receipt acknowledgement with data packets that have been sent to the destination node in order to identify which data packet is being acknowledged. Based on this correlation, the controller determines that retransmission processing for the data packet correlated with the indication of receipt acknowledgement is able to end. Based upon this correlation in one example, it is determined that an acknowledgment for that data packet has been received and the data packet is deleted, at 508. The controller processing flow 500 ends.

Returning to the decision at 506, if it is determined that a receipt acknowledgment has not been received for that data packet a determination is made, at 510, if a retransmission is necessary. The retransmission of a data packet is able to be based on one or more of several conditions defined for the particular communications protocol being implemented. In an example, a data packet is able to be retransmitted because an expiration of a specified time interval for which to wait for a receipt acknowledgment of the last data packet transmission, a condition sometimes referred to as an acknowledgement timeout. Other criteria to determine a necessity to retransmit the data packet include, for example, processing using fast retransmit techniques. If it is determined that the data packet retransmission is necessary, a retransmission data packet corresponding to the data packet is transmitted, at 512, to the destination node specified by the data packet. In some examples, a retransmission packet corresponding to the data packet is reconstructed based upon the received data that is stored by the controller, and the controller transmits the retransmission packet to the destination node specified by the data packet. Returning to the decision at 510, if it is determined that data packet retransmission is not necessary, or after the retransmission data packet is transmitted, at 512, the controller processing 500 ends.

Returning to the decision at 502, if the received data does not define a data packet, a determination is made, at 520, to determine if the received data is information associated with a data packet that is less than that required to reconstruct the data packet. Such information is able to be an indication of a receipt acknowledgement message, information describing a data packet stored locally at the forwarder node, any other information, or combinations of these. In general, this information includes identification information for the data packet, which is able to include, for example, a packet identifier, a packet type indicator, other relevant information, or combinations of these. If this determination is true, the received data is stored, at 521.

Returning to the determination at 520, if that determination is false or after the received data is stored, at 521, a determination is made, at 522, if a receipt acknowledgement indication is received for the data packet whose information was received. In one example, the determination of a receipt of a receipt acknowledgment include receiving from any forwarder node an indication of a receipt acknowledgement and correlation of that indication with information associated with the data packet. If it is determined that a receipt acknowledgment indication has been received, the forwarder node storing the associated data packet is directed to delete the locally stored data packet, at 528, and the process ends.

Returning to the determination at 522, if a receipt acknowledgement for the data packet has not been received, a determination is made, at 524, as to whether retransmission of the data packet is necessary. In one example, the determination of a necessity to retransmit the data packet is able to be based on observing that an ACK timeout has occurred for that data packet. In further examples, retransmission of the data packet is able to be based on one or more of several criteria, such as processing using fast retransmit techniques. This process is similar to that described above with regards to the decisions at 506 and 510. If it is not determined that the data packet is to be retransmitted, the process returns to determining, at 522, if a receipt acknowledgement has been received. If it is determined that data packet retransmission is necessary, a determination is made, at 526, if the maximum number of transmission retries has occurred. If it is determine that the maximum number of retries has occurred, the process at 528, the forwarder node storing the data packet to delete the data packet and the process ends. If the maximum number of retries has not occurred, the forwarder node is directed, at 530, to retransmit the data packet to its destination. The process then returns to determining, at 522, if a receipt acknowledgement has been received.

Figure 6:
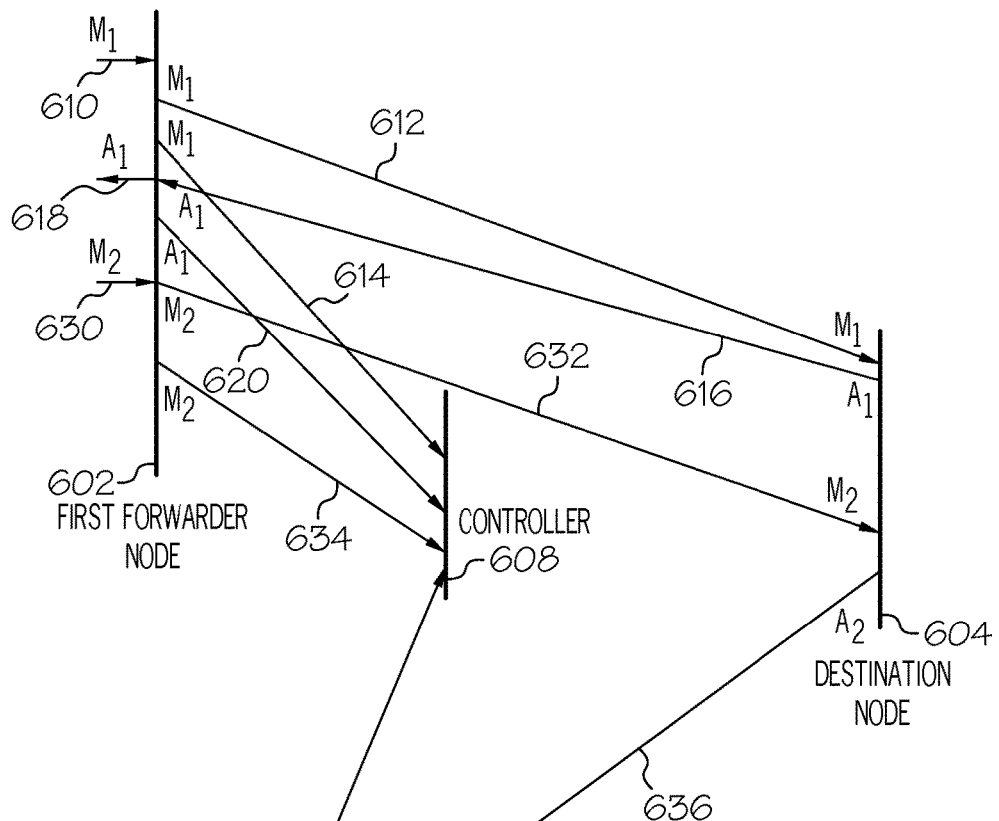
FIG. 6 illustrates message exchanges for successful packet delivery, according to an example.
Figure 6:
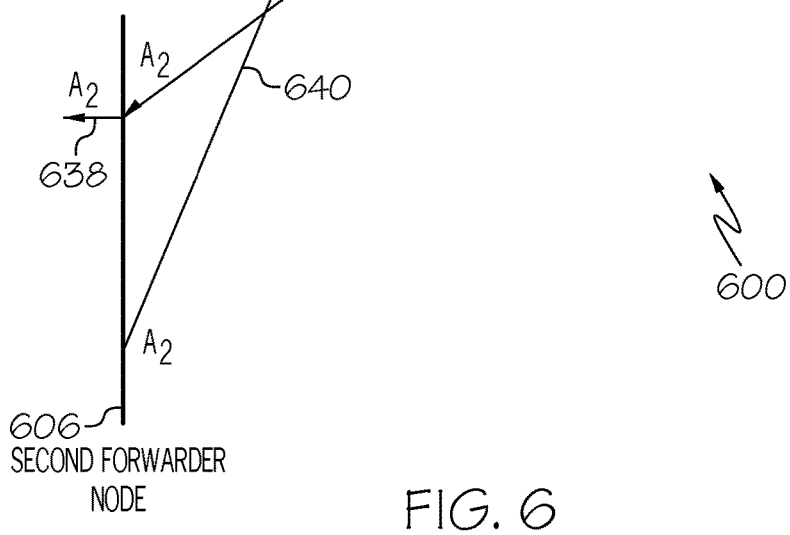

FIG. 6 illustrates message exchanges for successful packet delivery 600, according to an example. The message exchanges for successful packet delivery 600 illustrate the communication of messages between various nodes implementing the successful delivery of two data packets, a first message M1 610 and a second message M2 630, to a destination node 604. Illustrated processing nodes include a first forwarder node 602, a second forwarder node 606, a controller 608, and the destination node 604. These correspond to the similar components illustrate above with regards to example network topology 100. In this depiction, time is shown at each node as flowing from top to bottom, however, the absolute vertical position at one node in this diagram is not necessarily related to the same time in the same vertical position of other nodes.

A received first message M1 610 is shown as being received from Path A, such as is similar to the Path A 110 discussed above, by the first forwarder node 602. The received first message M1 610 is received from an upstream communications link and is addressed to be sent to the destination node 604. The first forwarder node 602 is configured to send a transmitted first message M1 612, which is a copy of the received first message M1 610, to the destination node 604. Information associated with the received first message M1 614 is also sent to the controller 608. This information is able to be the complete message, data sufficient to reconstruct the first message, or information describing the message such as is used to determine the association between that message and a later receipt acknowledgement, or ACK, for that message.

In this example, the destination node 604 successfully receives the transmitted first message M1 612 and acknowledges its receipt by sending ACK A1 616 to the first forwarder node 602. The first forwarder node 602 resends this as a transmitted ACK A1 618 back to the original sender of the first message M1 610. The first forwarder node 602 also sends information associated with this acknowledgment, as ACK info A1 620, to the controller 608 to allow the controller to terminate special retransmission processing for the first message M1 610. In general, the ACK info A1 620 includes enough information for the controller to correlate the ACK with the message being acknowledged.

The message exchanges for successful packet delivery 600 further illustrates a second message M2 630 as being received by the first forwarder node 602. The second message M2 630 is also received from the same upstream communications link, Path A, as is described above and is addressed to be sent to the destination node 604. The first forwarder node 602 is configured to send a transmitted second message M2 632, which is a copy of the received second message M2 630, to the destination node 604. Information associated with the second received message M2 634, which is similar to the information described above, is also sent to the controller 608. Based upon, for example, an identified data packet type of the second message M2 630, different information associated with the second received message 634 is able to be sent to the controller. In this example, the destination node 604 also successfully receives the transmitted second message M2 632 and acknowledges its receipt by sending ACK A2 636 to the second forwarder node 606. The selection of a different forwarder node for sending the ACK message is controlled by various factors such as path congestion or other network topology operating conditions or data. The second forwarder node 606, resends this as the transmitted ACK A2 638 back to the original sender of the second message M2 630 over Path B. The second forwarder node 606 further sends information associated with this acknowledgment, as ACK info A2 640, to the controller 608 to allow the controller to terminate special retransmission processing for the second message M2 630.

As described above, the design of the example network topology 100, which is able to support the illustrated messages exchanges for successful packet deliver 600, allows a controller 130 to monitor data packets being sent to each destination node over one of multiple available communications paths to the destination node, and to also monitor the communications of receipt acknowledgements sent by the destination node over either the same or over a different communication path. Placement of forwarder nodes in each available communications path to the destination node 104 allows the controller 130 to monitor any combinations of paths to send and receive data to the destination node 104 and to efficiently implement the above described special retransmission processing to retransmit data packets that are not received. In some examples, the forwarder nodes are located closer substantially closer along the communications path to the destination node than is the source of the data packets. The closer location of the forwarder nodes allows those nodes to more efficiently perform retransmission processing than the source of the data packets, which is a conventional point of control for retransmission of data that are able to be communicated to a destination node over multiple possible data paths.

Figure 7:
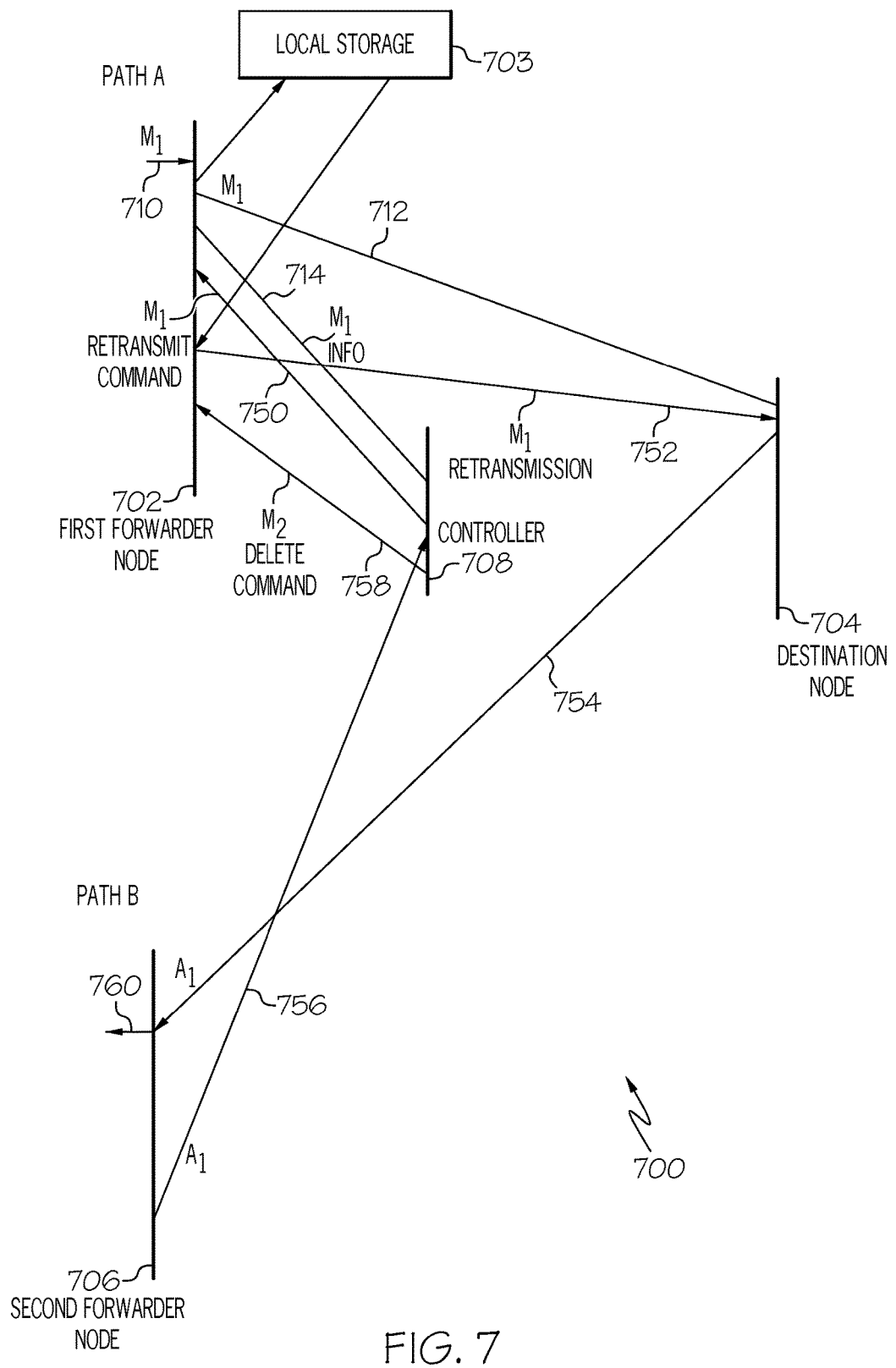
FIG. 7 illustrates message exchanges for a first example failed data packet delivery, according to an example.

FIG. 7 illustrates message exchanges for a first example failed data packet delivery 700, according to an example. The first example failed data packet delivery 700 illustrates the communication of messages between various nodes in the event of a failed first delivery attempt of a data packet, which is referred to as a message below, to the destination node 704, followed by a successful delivery of a retransmission of that data packet. In the first example failed data packet delivery 700, the forwarder node transferring the original data packet stores a local copy of the data in the data packet and performs the retransmission. The controller, as is described herein, controls the retransmission process. In this depiction, as described above, time is shown at each node as flowing from top to bottom, however, the absolute vertical position at one node in this diagram is not necessarily related to the same time in the same vertical position of other nodes.

A message M1 710 is shown as being received by the first forwarder node 702. As above, the message M1 710 is received from an upstream communications link over Path A and is addressed to be sent to the destination node. The first forwarder node 702 is configured to send a transmitted message M1 712, which is a copy of the received message M1 710, to the destination node 704. The first forwarder node 702 in this example is also configured to locally cache the data within the message M1 710 into a local storage 703. The data stored in the local storage is sufficient to recreate the message M1 710 and may include a simple copy of the data packet. Information associated with the received message M1 714, which is a data packet in this example, is also sent to the controller 708. Upon receipt of this information, the controller 708 in one example knows, due to, e.g., due to network configuration or due to data contained in the information, that the first forwarder node 702 is locally caching the data packet and retransmission can be effected by merely sending a retransmission command to the first forwarder node 702. Because the first forwarder node 702 is locally caching this message, the information sent to the controller is able to be an abbreviated set of information that only sufficiently describes the message to support correlating the message with a receipt acknowledgement for that message. In further examples, however, a more complete set of information associated with the message, or data packet, is able to be sent to the controller.

In this example, the destination node 704 does not acknowledge receipt of the transmitted message M1 712. The controller 708 monitors information sent from all forwarder nodes, including the first forwarder node 702 and the second forwarder node 806, to determine if a receipt acknowledgement has been sent by the destination node 804. If no receipt acknowledgment has been sent by the destination node 704 over any transmission path monitored by a forwarder node, the controller determines that an ACK timeout occurs. Upon determining that an ACK timeout occurs, the controller 708 sends a retransmission command 750 to the first forwarder node 702. In addition to determining that an ACK timeout occurred, the controller in some examples is able to determine that a data packet is to be retransmitted based on other criteria, such as retransmissions based on fast retransmit techniques.

The first forwarder node 702, based on receiving the retransmission command 750, sends an M1 retransmission 752 to the destination node 704. The destination node 704 successfully receives, in this example, the M1 retransmission 752 and acknowledges its receipt by sending ACK A1 754 to the second forwarder node 706. The second forwarder node 706, resends this as a transmitted ACK A1 760 back to the original sender of the message M1 710 over Path B. The second forwarder node 706 also sends information associated with this acknowledgment, as ACK info A1 756, to the controller 708 to allow the controller to terminate special retransmission processing for the message M1 710.

It is noted that in some examples, the controller 708 is able to use an ACK timeout that is shorter than the ACK timeout normally used by an originator of the messages or data packets being sent to the destination node 704. In some examples, the forwarder nodes are located at positions within a communications path that are significantly closer to the destination node than the originator of the data packet, and thus can expect the data packet transmission and acknowledgement between the forwarder node to be quicker than that experienced by the originator of the data packet with is able to be separated along the communications path to the destination node by many intermediary nodes. The shorter ACK timeout used by the controller in this example of special retransmission processing allows the retransmission and successful delivery of a data packet to be completed and its receipt acknowledgement sent to the source without the source inferring communications problems on the communications path to the destination node.

Figure 8:
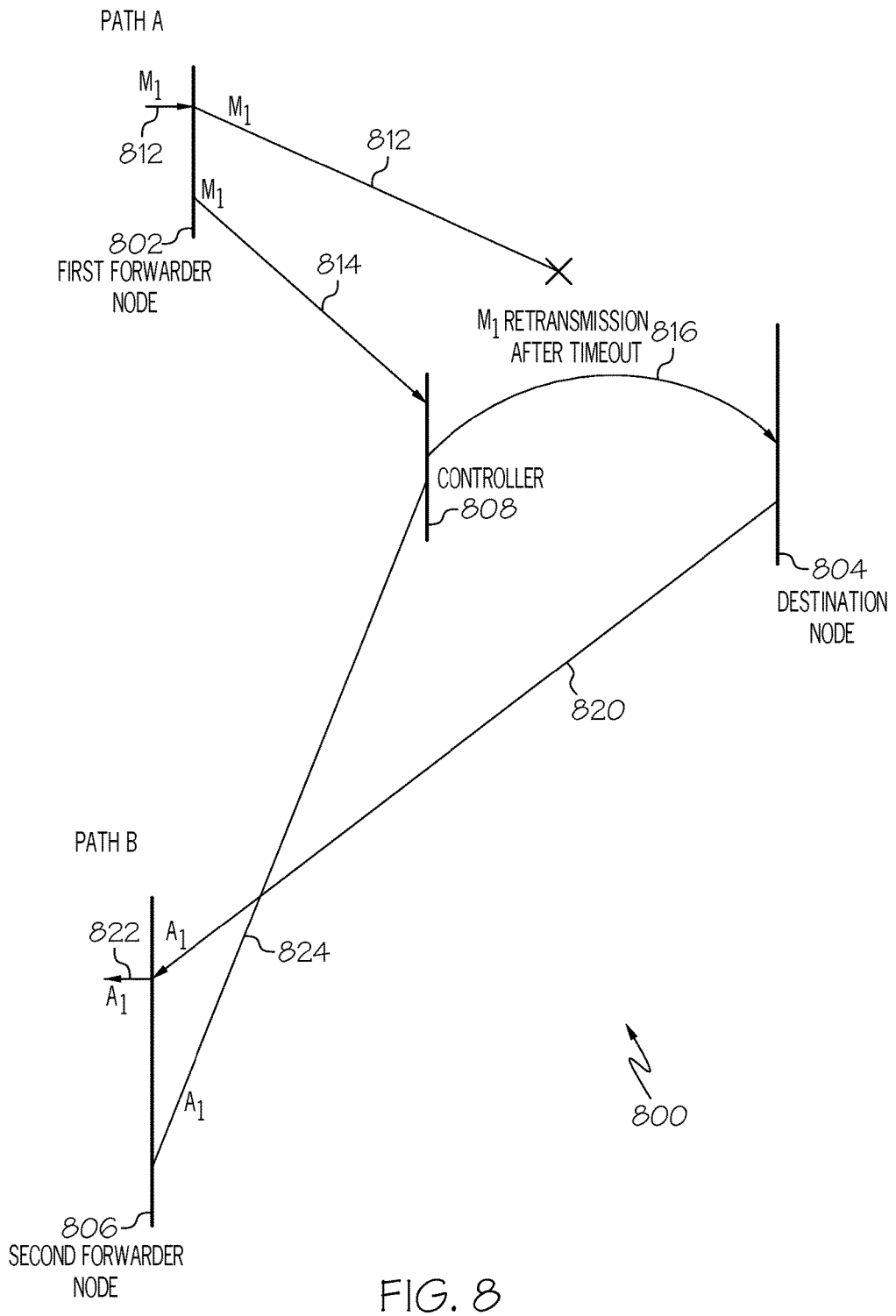
FIG. 8 illustrates message exchanges for a second example failed data packet delivery, according to an example.

FIG. 8 illustrates message exchanges for a second example failed data packet delivery 800, according to an example. The second example failed data packet delivery 800 illustrates a similar communications failure as depicted above for the first example failed data packet delivery 700, where the transmitted message M1 712 is not successfully received by the destination node and a retransmission of the data packet is sent to and successfully received by the destination node. In the second example failed data packet delivery 800, however, the controller 808 is sent enough information associated with the data packet to allow the controller 808 to recreate the data packet. Upon detecting a failure of the destination node to successfully receive the first transmission, the controller 808 itself recreates and sends the retransmitted data packet to the destination node 804. In this depiction, as is described above, time is shown at each node as flowing from top to bottom, however, the absolute vertical position at one node in this diagram is not necessarily related to the same time in the same vertical position of other nodes.

A message M1 810 is shown as being received by the first forwarder node 802. As above, the message M1 810 is received from an upstream communications link and is addressed to be sent to the destination node 804. The first forwarder node 802 sends a transmitted message M1 812, which is a copy of the received message M1 810, to the destination node 804, but the transmission fails. The first forwarder node 802 in this example does not locally cache the message M1 810, but sends message information M1 814 to the controller 808 that is sufficient to recreate the message M1 810. The controller 808 monitors information sent from all forwarder nodes to determine if a receipt acknowledgement has been sent by the destination node 804. If no receipt acknowledgment has been sent by the destination node 804 over any transmission path, the controller determines that an ACK timeout occurs. Upon determining that an ACK timeout occurs, the controller proceeds to recreate the message M1 and retransmits it as retransmitted message M1 816 to the destination node 804. The destination node 804 receives this retransmission and acknowledges receipt of the retransmitted message M1 816 by sending ACK A1 820 to the second forwarder node 806. The second forwarder node 806 resends this as a transmitted ACK A1 860 back to the original sender of the message M1 810. The second forwarder node 806 also sends information associated with this acknowledgment, as ACK info A1 824, to the controller 808 to allow the controller to terminate special retransmission processing for the message M1 810. As is discussed above, a determination to retransmit a data packet is able to be made based on various criteria, such as retransmission processing using fast retransmit techniques.

Information Processing System

Figure 9:
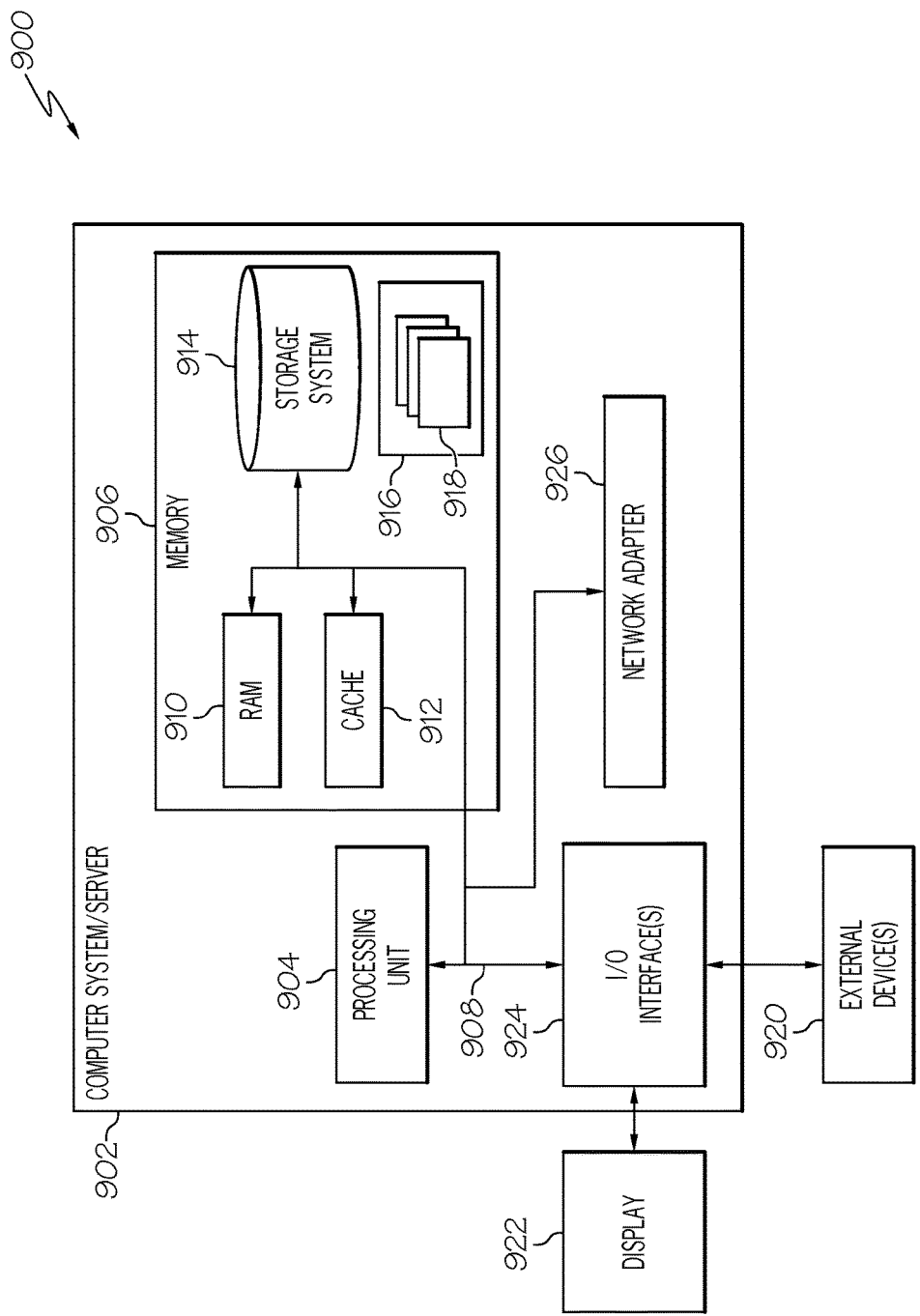
FIG. 9 is a block diagram illustrating one example of an information processing system according to one example.

Referring now to FIG. 9, this figure is a block diagram illustrating an information processing system 900 that can be utilized in various examples of the present disclosure. The information processing system 902 is based upon a suitably configured processing system configured to implement one or more embodiments of the present disclosure. Any suitably configured processing system can be used as the information processing system 902 in embodiments of the present disclosure. In another embodiment, the information processing system 902 is a special purpose information processing system configured to perform one or more embodiments discussed above. The components of the information processing system 902 can include, but are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of various examples described above.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of the above described processes and systems.

The information processing system 902 can also communicate with one or more external devices 920 such as a keyboard, a pointing device, a display 922, and the like. The information processing system 902 is further able to communicate with one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, at a network node, a data packet with a source address and a destination address, the network node being separate from a source node with the source address and separate from a destination node with the destination address;
   sending the data packet along a network path to the destination node;
   identifying a data packet type of the data packet; and
   sending to a controller node that is separate from the network node, based on a determination that the data packet type is within a set of determined data packet types and based on sending the data packet to the destination node, information identifying the data packet, the controller node being independent of the network path.

2. The method of claim 1, wherein the information identifying the data packet comprises at least a portion of the data packet.

3. The method of claim 1, further comprising:
   storing at least a portion of the data packet into a data storage;
   deleting, based on receiving an indication from the controller node to delete the data packet, the at least the portion of the data packet from the data storage; and
   resending, based on a retransmission instruction from the controller, the at least the portion of the data packet to the destination node.

4. The method of claim 3, further comprising receiving a message from the controller node comprising at least one of the indication to delete the data packet and the retransmission instruction.

5. The method of claim 1, wherein identifying the data packet type comprising determining a characteristic of the data packet, the characteristic comprising at least one of a subnet of an address within the data packet, a TCP port number of the data packet, and a flow direction of the data packet and wherein the data packet type is based on the characteristic.

6. The method of claim 1, further comprising defining, based on the data packet type, the information identifying the data packet to comprise data packet addressing and data packet payload data contained within the data packet.

7. The method of claim 1, further comprising selecting components of the data packet to be contents of a subset of data contained within the data packet, wherein the information associated with the data packet comprises only the subset.

8. The method of claim 7, wherein the subset comprises only information to identify the data packet for correlation of a receipt acknowledgement with the data packet.

9. A method, comprising:

receiving, via a first controller link at a controller node, information associated with a data packet from a first forwarder node, the first forwarder node being any forwarder node within a plurality of forwarder nodes each monitoring communications along separate communications paths, the first forwarder node forwarding the data packet to a destination node via a first communications path, each forwarder node further communicating with the controller node;

receiving, via a second controller link at the controller node from a second forwarder node subsequent to receiving the information, an indication of receipt by the second forwarder node of a receipt acknowledgement for the data packet, the second forwarder node being separate from the first forwarder node and the controller node, and the second forwarder node communicating with the destination node via a different communication path than the first communications path, where one of the first controller link or the second controller link is independent of the first communication path and the different communications path;

correlating the indication of the receipt acknowledgement with the data packet; and based on correlating the indication of the receipt acknowledgment with the data packet, deleting data associated with retransmission processing of the data packet.

10. The method of claim 9, wherein the first forwarder node and the second forwarder node are separate from one another, wherein the first forwarder node monitors a first communications path, and wherein the second forwarder node monitors a second communications path , the first communications path and the second communications path each comprising independent, alternative communications paths of a communications channel communicatively coupling a source node and the destination node.

11. The method of claim 9, further comprising:

determining, after an acknowledgement timeout time interval, a lack of an indication of a receipt acknowledgment for the data packet; and based on determining the lack of the indication, causing transmission of a retransmission packet corresponding to the data packet.

12. The method of claim 11, wherein the information identifying the data packet comprises identification information for the data packet, and wherein the causing transmission of the retransmission packet comprises instructing the first forwarder node to send the retransmission packet.

13. The method of claim 11, wherein the information associated with the data packet comprises data packet addressing data and data packet payload data contained within the data packet, and the method further comprising:

storing the information associated with the data packet; and creating, based on determining the acknowledgement timeout time interval, the retransmission packet, and wherein the causing transmission of the retransmission packet comprises transmitting the retransmission packet to a destination node specified for the data packet.

* * * * *